US007253610B2

(12) United States Patent
Nagae

(10) Patent No.: US 7,253,610 B2
(45) Date of Patent: Aug. 7, 2007

(54) SELF-POWERED BICYCLE SIGNAL OUTPUT DEVICE AND DISPLAY APPARATUS USING SAME

(75) Inventor: Masayoshi Nagae, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 183 days.

(21) Appl. No.: 10/905,748

(22) Filed: Jan. 19, 2005

(65) Prior Publication Data

US 2005/0156590 A1 Jul. 21, 2005

(30) Foreign Application Priority Data

Jan. 21, 2004 (JP) ............................. 2004-013299

(51) Int. Cl.
*G01P 3/48* (2006.01)
*B60Q 1/00* (2006.01)

(52) U.S. Cl. ...................... 324/174; 324/167; 340/432; 340/441; 340/463; 340/466; 340/467; 340/670; 340/691.6; 340/693.4

(58) Field of Classification Search ................ 340/432, 340/441, 448, 463, 466–467, 670, 671, 691.6, 340/693.1, 693.4; 324/167, 171, 174
See application file for complete search history.

(56) References Cited

U.S. PATENT DOCUMENTS 4,071,892 A * 1/1978 Genzling .................... 701/200
4,095,663 A * 6/1978 Gaffney ...................... 180/205
5,008,647 A 4/1991 Brunt et al.
5,170,161 A 12/1992 Sakurai
5,177,432 A 1/1993 Waterhouse et al.
5,480,356 A 1/1996 Campagnolo
6,229,454 B1 * 5/2001 Heikkila et al. ....... 340/870.14

FOREIGN PATENT DOCUMENTS

| | | | | |
|---|---|---|---|---|
| DE | 41 09 006 | A1 | | 9/1992 |
| DE | 42 12 321 | A1 | | 10/1993 |
| DE | 196 04 467 | A1 | | 8/1997 |
| DE | 200 03 309 | U1 | | 8/2000 |
| EP | 402620 | B1 | | 12/1990 |
| EP | 645868 | A2 | | 3/1995 |
| JP | 02-018167 | U | | 1/1990 |
| JP | 02-088972 | A | | 3/1990 |
| JP | 07094213 | A | * | 4/1995 |
| JP | 08-301175 | A | | 11/1996 |
| JP | 09-076982 | A | | 3/1997 |
| JP | 09-233793 | A | | 9/1997 |
| JP | 11-020762 | A | | 1/1999 |
| JP | 2000-152583 | A | | 5/2000 |

* cited by examiner

*Primary Examiner*—Bot LeDynh
(74) *Attorney, Agent, or Firm*—James A. Deland

(57) ABSTRACT

A bicycle signal output device comprises a magnet structured to be mounted to one of a first part and a moving part of a bicycle, a coil structured to be mounted to the other one of the first part and the moving part of the bicycle, and a signal generating unit that operates using electrical power generated by the coil in response to relative motion between the magnet and the coil.

24 Claims, 6 Drawing Sheets

SELF-POWERED BICYCLE SIGNAL OUTPUT DEVICE AND DISPLAY APPARATUS USING SAME

BACKGROUND OF THE INVENTION

The present invention is directed to bicycles and, more particularly, to a self-powered bicycle signal output device and equipment that may use such a device.

Conventional cycle computers display riding information such as bicycle speed and riding distance. Such cycle computers typically comprise a rotation sensor and a parameter display device, wherein the rotation sensor outputs rotation signals in accordance with the rotation of a wheel, and the riding parameter display device displays bicycle speed and riding distance in response to the output rotation signals. It is also known to transmit the rotation signals wirelessly from the rotation sensor to the display device. Such a system is disclosed in Japanese unexamined patent application publication 3-12798. The device disclosed therein comprises a display unit and a signal generating unit for generating the rotation signals. The signal generating unit comprises a reed switch and a transmitting unit, wherein the reed switch detects the passage of a magnet attached to a spoke of the wheel, and the transmitting unit wirelessly transmits the rotation signals generated by the reed switch. The signal generating unit operates using a battery as the power source. The display unit comprises a case attached to a handlebar of the bicycle. In the case are provided a receiving unit that receives the transmitted rotation signals, a signal conversion unit that converts the received rotation signals to speed indicating information, and a display that displays the speed indicating information. The display unit also operates using a battery as the power source.

Since a battery is used as the power source for the various components, once the battery is expended, the device does not operate until the battery is replaced. To overcome this problem, it is possible to supply power from an electricity-generating hub dynamo or the like that operates using the rotation of the bicycle wheel. However, since the output from such a dynamo is in the form of a large alternating current, a variety of devices must be employed to condition the power for use in the cycle computer. This tends to make the overall device larger. Furthermore, such dynamos create undesirable resistance to pedaling for the rider. Thus, the use of a dynamo as a power source for a signal output device for wirelessly outputting rotation signals creates several problems.

SUMMARY OF THE INVENTION

The present invention is directed to various features of a bicycle signal output device. In one embodiment, a bicycle signal output device comprises a magnet structured to be mounted to one of a first part and a moving part of a bicycle, a coil structured to be mounted to the other one of the first part and the moving part of the bicycle, and a signal generating unit that operates using electrical power generated by the coil in response to relative motion between the magnet and the coil. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
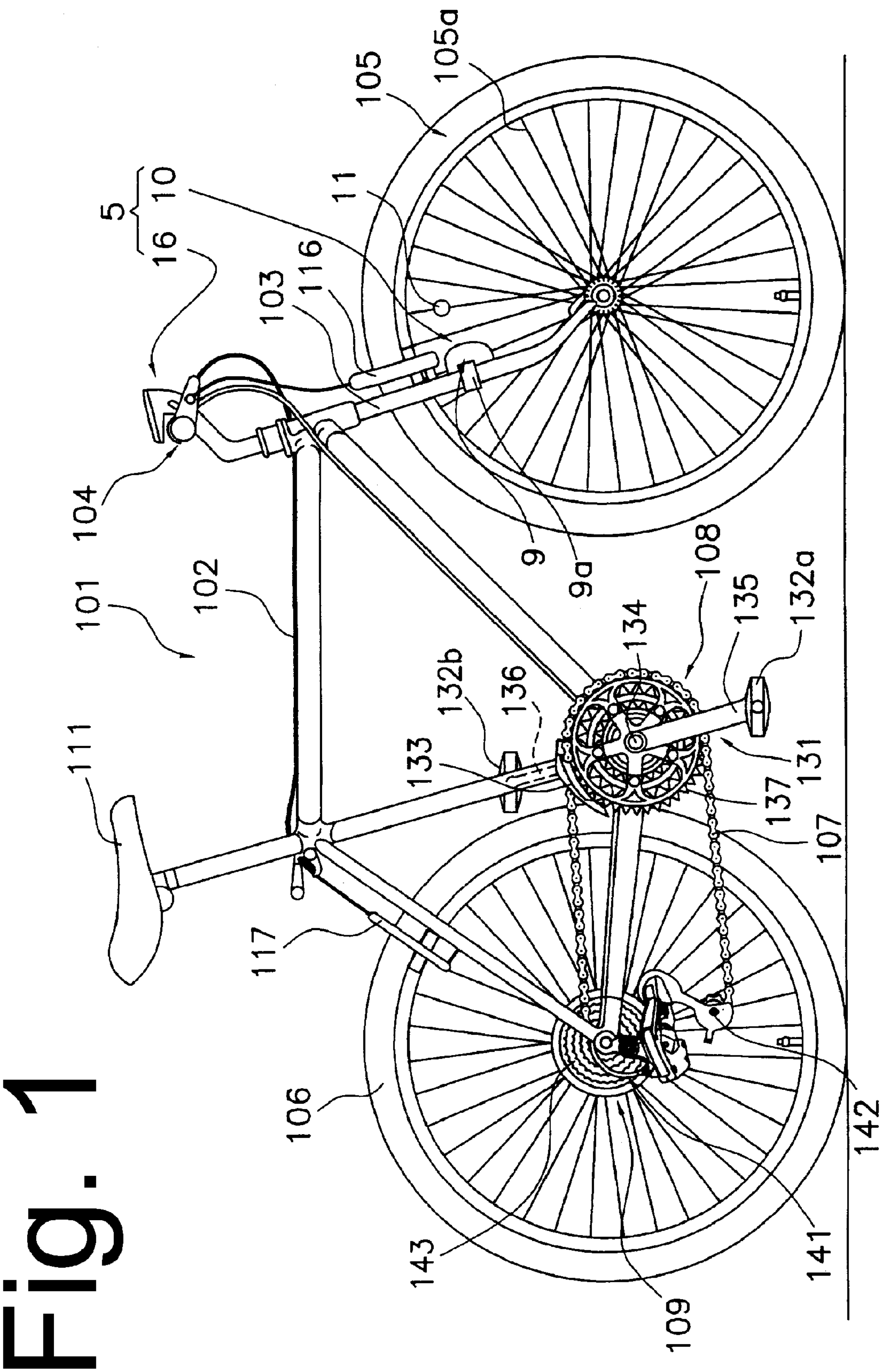
FIG. 1 is a side view of a particular embodiment of a bicycle.
Figure 3:
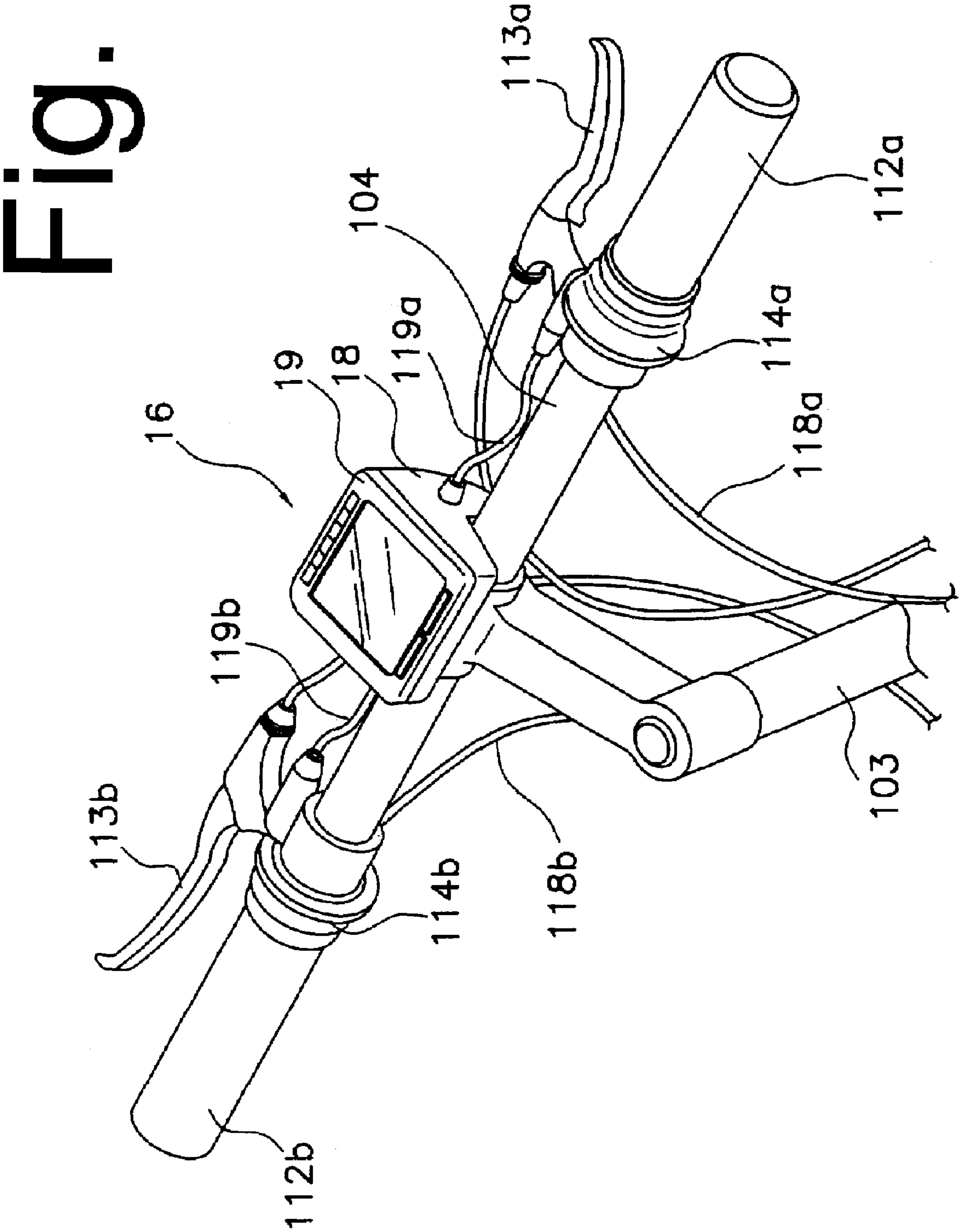
FIG. 3 is view of a particular embodiment of components mounted to the bicycle handlebar.

FIG. 1 is a side view of a particular embodiment of a bicycle 101. Bicycle 101 is a sport bicycle of a mountain bicycle type, and it comprises a frame 102, a front fork 103 rotatably mounted to frame 102, a handlebar assembly 104 mounted to the upper part of fork 103, a front wheel 105 rotatably attached to the lower part of fork 103, a rear wheel 106 rotatably attached to the rear of frame 102, a chain 107, a front transmission 108 disposed at the lower middle portion of frame 102, a rear transmission 109 disposed at the rear of frame 102, and a saddle 111 mounted to the upper middle portion of frame 102. A front wheel brake 116 is provided for braking front wheel 105, and a rear wheel brake 117 is provided for braking rear wheel 106. As shown in FIG. 3, respective grips **112*a*, 112*b* and brake levers 113*a*, 113*b* are provided at opposite ends of handlebar assembly 104. Brake lever 113*b* is connected to front wheel brake 116 for braking front wheel 105, and brake lever 113*a* is connected to rear wheel brake 117 for braking rear wheel 106**.

Front transmission 108 transmits the pedaling force generated by the rider to rear transmission 109 via chain 107. Front transmission 108 comprises a plurality of, e.g., three sprockets 137 of various sizes and a front derailleur 133. The three sprockets 137 are installed on a gear crank 131 that is rotated when the rider pushes pedals **132*a* and 132*b*. Gear crank 131 comprises a crankshaft 134 that passes horizontally and rotatably through the central lower part of frame 102, a right crank 135, and a left crank 136. One end of right crank 135 is connected to the right side of crankshaft 134, and the three sprockets 137 are attached to right crank 135. One end of the left crank 136 is connected to the left side of crankshaft 134. The other ends of right crank 135 and left crank 136 rotatably support pedals 132*a* and 132*b*, respectively. Front derailleur 133 engages chain 107 with one of the three sprockets 137 and can be operated by a control cable 118*b* (FIG. 3) connected to a twist-grip style shift control device 114*b* integrally mounted with brake lever 113*b* on the left side of handlebar assembly 104. Shift control device 114*b* may include a front gear position sensor 28 (FIG. 5) that provides signals to indicate the operating position of front derailleur 133**.

Rear transmission 109 serves to transmit the driving force of chain 107 to rear wheel 106. Rear transmission 109 comprises a rear sprocket cluster 141 and a rear derailleur 142. In this embodiment, rear sprocket cluster 141 comprises a plurality of, e.g., nine sprockets 143 of different sizes that are mounted concentrically with the hub portion of rear wheel 106. Rear derailleur 142 engages chain 107 with one of the nine sprockets 143 and can be operated by a control cable **118*a* (FIG. 3) connected to a twist-grip style shift control device 114*a* integrally mounted with brake lever 113***a* on the right side of handlebar assembly 104. Shift control device 114*a* may include a rear gear position sensor 29 (FIG. 5) that provides signals to indicate the operating position of rear derailleur 142.

A cycle computer 5 comprising a rotation sensor 10 and a display control device 16 is mounted to bicycle 101. Rotation sensor 10 includes a housing 9 mounted to front fork 103 through a screwed-on band 9*a*. Rotation sensor 10 detects the passage of a magnet 11 mounted by a screw or some other device to a spoke 105*a* of front wheel 105.

Figure 2:
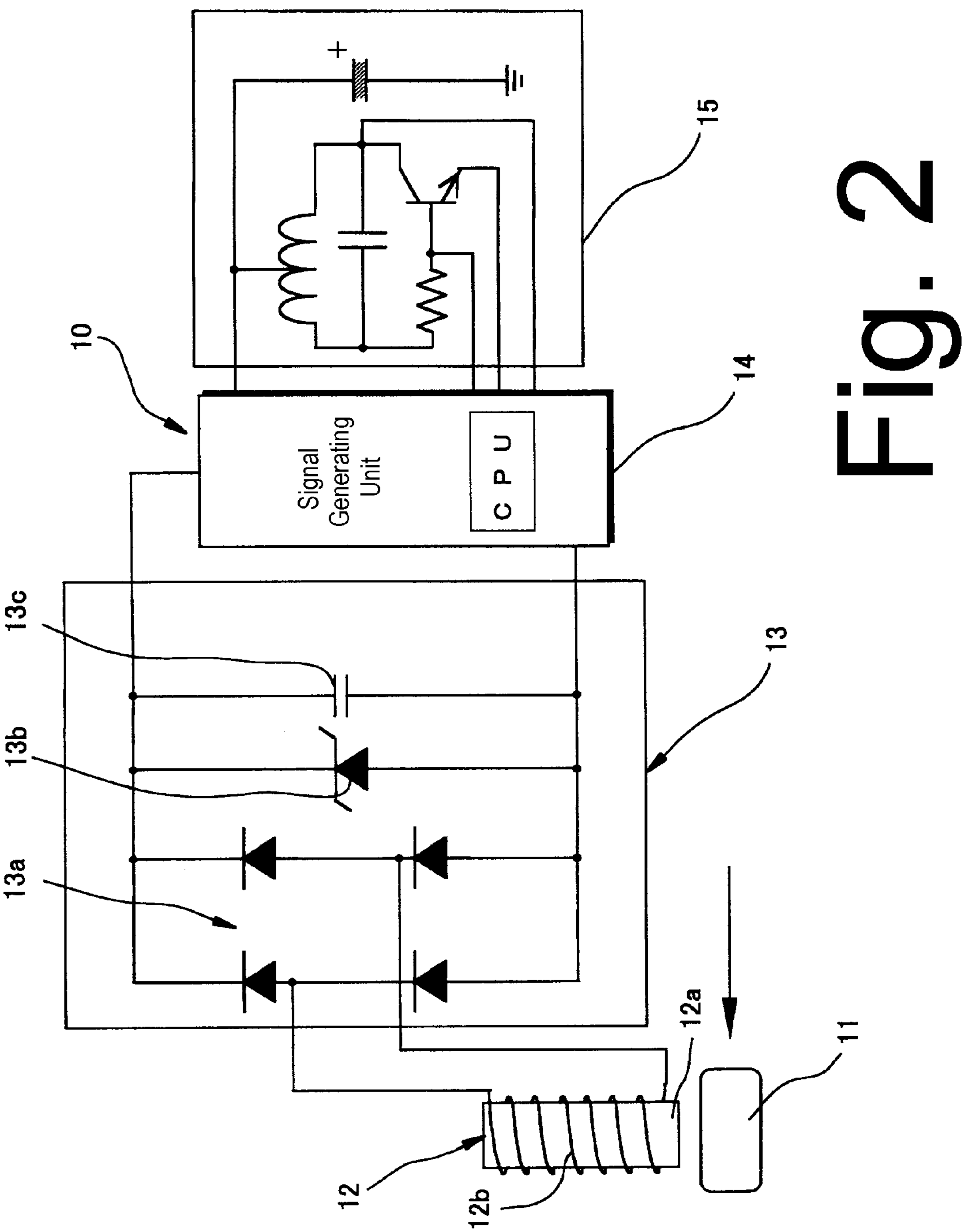
FIG. 2 is a schematic diagram of a particular embodiment of a bicycle output device.

As shown in FIG. 2, in this embodiment rotation sensor 10 comprises a coil 12 that can be positioned in close proximity to the path of magnet 11, a rectifier 13 that rectifies current induced in coil 12 by movement of magnet 11 past coil 12, a signal generating unit 14 that operates using the rectified electrical power and generates rotation signals in accordance with the rotation of front wheel 105, and a wireless transmission unit 15 that wirelessly transmits the generated rotation signals. Coil 12, rectifier 13, signal generating unit 14 and wireless transmission unit 15 are housed inside sensor case 9.

Coil 12 may comprise, for example, a copper wire winding 12*b* coiled around a ferrite core 12*a*. The shape of core 12*a* may be rod-like or some other shape. Rectifier 13 may comprise, for example, a full-wave rectifying diode bridge 13*a* that rectifies the electrical power generated by coil 12, a voltage regulating element in the form of a Zener diode 13*b* that regulates the voltage of the rectified electrical power from diode bridge 13*a*, and a capacitor 13*c* that smoothes the rectified and regulated electrical power. Signal generating unit 14 comprises, for example, a microcomputer (CPU) that operates using the electrical power from rectifier 13 and generates rotation signals according to the rotation of front wheel 105 using appropriate software. Wireless transmission unit 15 comprises, for example, a Hartley transmission circuit that wirelessly transmits the generated rotation signals as signals of a selected frequency of, for example, approximately 40 kHz.

As shown in FIG. 3, display control device 16 is mounted to the middle portion of handlebar 104. Display control device 16 includes a case 19 that is detachably mounted to a bracket 18 mounted to handlebar assembly 104. Disposed within case 19 is display control unit 20 (FIG. 5) comprising a microcomputer that converts the rotation signals transmitted from rotation sensor 10 to speed information, distance information, and the like and displays the information to the rider. Display control device 16 also is connected to shift control devices 114*a* and 114*b* through respective input cables 119*a* and 119*b* to receive and display gear positions based on the gear position signals acquired by front gear position sensor 28 and rear gear position sensor 29.

Figure 4:
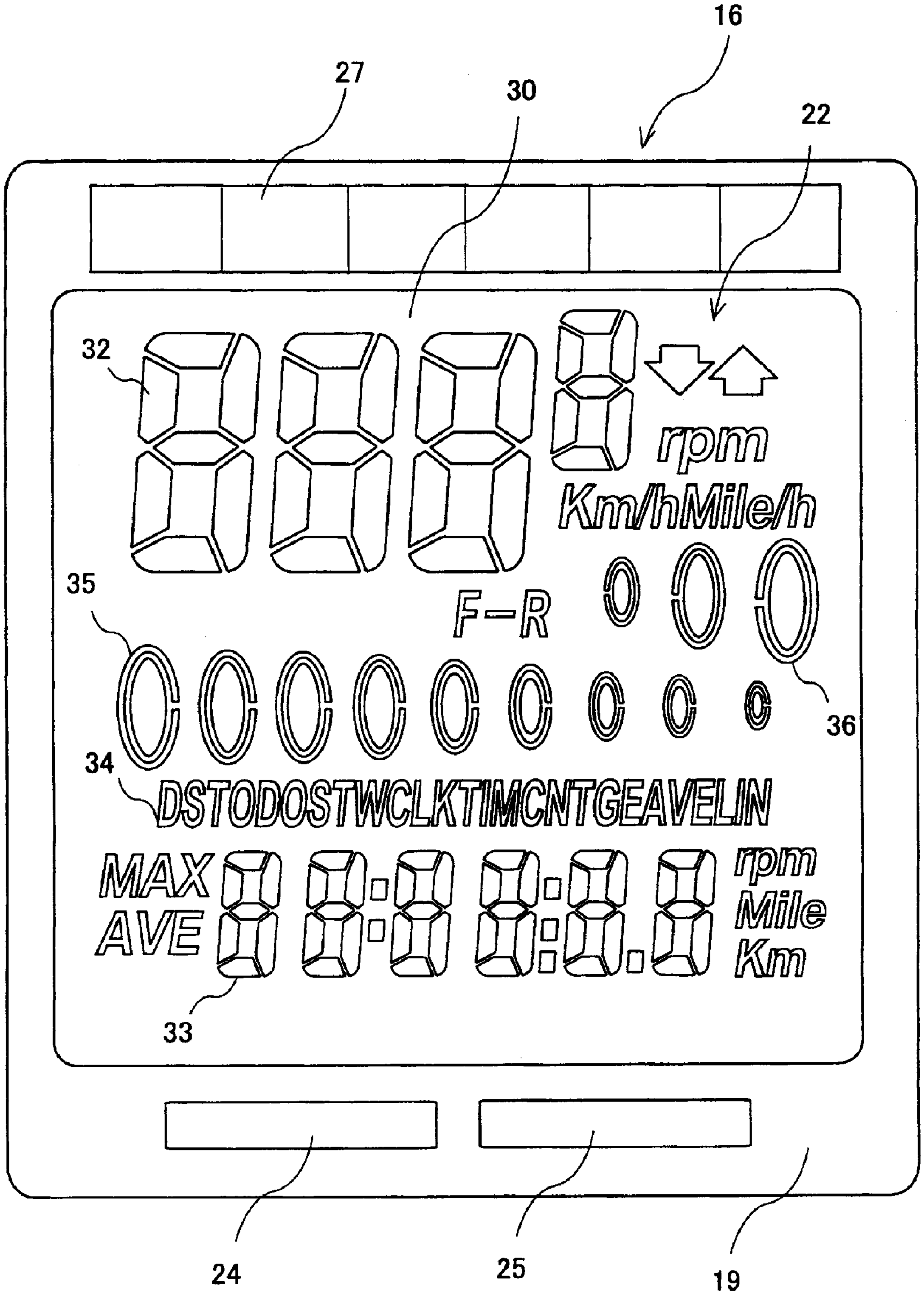
FIG. 4 is a plan view of a particular embodiment of a cycle computer display.
Figure 5:
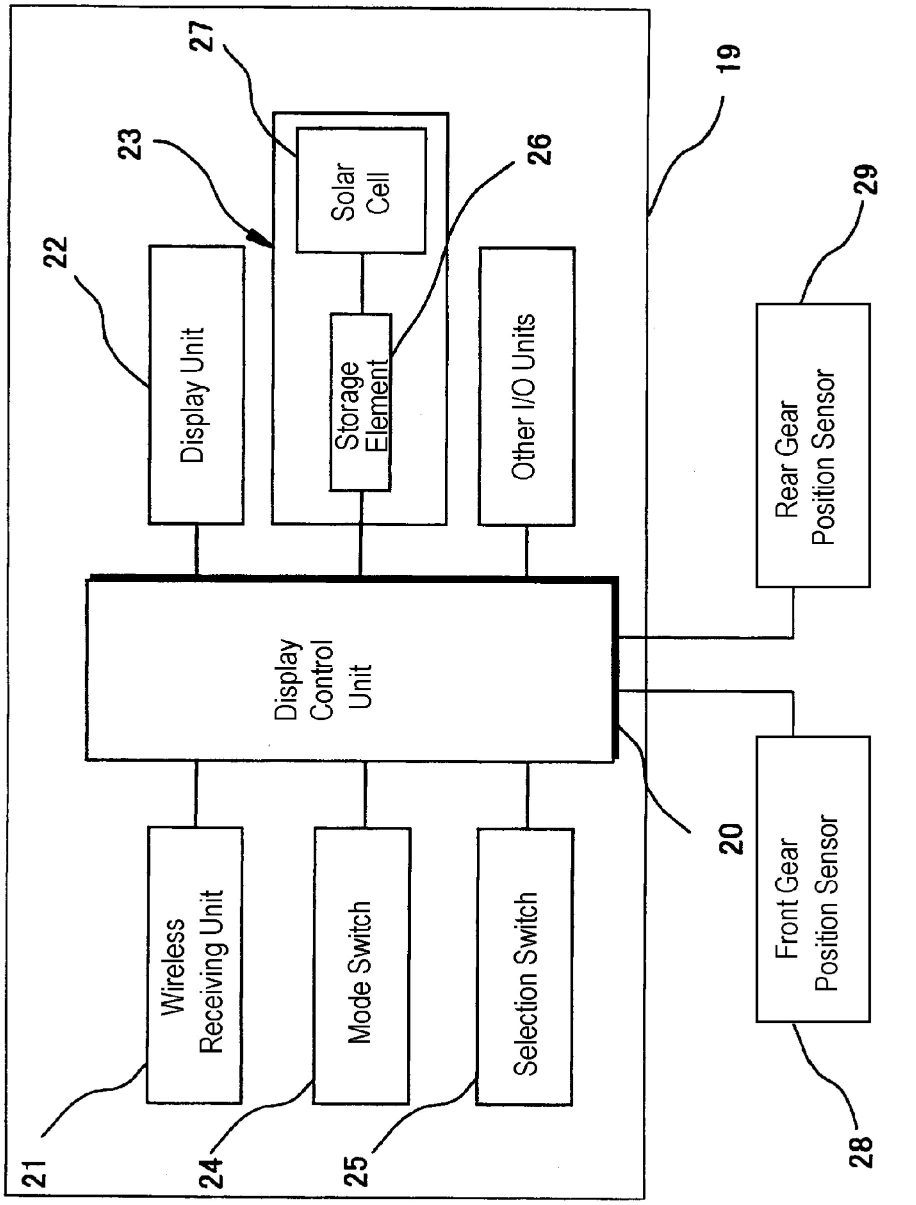
FIG. 5 is a schematic block diagram of the cycle computer display.

As shown in FIG. 5, connected to the display control unit 20 are a wireless receiving unit 21 that receives the rotation signals transmitted by rotation sensor 10, a display unit 22 such as a liquid crystal display that displays the various information, a power supply 23 that provides operating power to display control unit 20, a mode switch 24 for changing the display mode, a selection switch 25 for making various selections, the front gear position sensor 28 installed in front shift control device 114*b*, the rear gear position sensor 29 installed in rear shift control device 114*a*, and other input/output units. As shown in FIG. 4, mode switch 24 and selection switch 25 are physically positioned adjacent to each other at the lower front side of display unit 22.

In this embodiment, power supply 23 comprises a solar cell 27 and a storage element 26 that stores electrical power generated by solar cell 27. Solar cell 27 may be, for example, a known amorphous silicon type solar cell and may comprise, for example, 6 cells. Storage element 26 may be, for example, an electric double-layer capacitor or other high-capacity capacitor that can provide electrical power when solar cell 27 cannot generate sufficient electricity such as during the nighttime or during periods of inadequate sunlight. As shown in FIG. 4, solar cell 27 may be disposed on the upper front side of display unit 22.

FIG. 4 also illustrates an embodiment of information that may be shown on a display screen 30 of display unit 22. In this embodiment, display screen 30 comprises a segmented monochrome liquid crystal display screen that includes a main number display portion 32, a secondary number display portion 33, a description display portion 34, a rear gear position display portion 35, and a front gear position display portion 36. Information such as bicycle velocity, time, etc. is displayed in numerical format in main number display portion 32 and auxiliary number display portion 33. Description display portion 34 displays a description of the contents of main number display portion 32 and secondary number display portion 33. For example, "VEL" indicates travel velocity, "DST" indicates distance traveled, "ODO" indicates cumulative distance, "CLK" indicates current time, "TIM" indicates travel time, and "GEA" indicates current shift position of the front and rear transmissions. The unit of velocity can be switched between "Km/h" and "Mile/h", and the unit of distance can be switched between "Km" and "Mile." These displays may be selected by mode switch 24.

Rear gear position display portion 35 shows the gear position of rear transmission 109, and it comprises a plurality of, e.g., nine elliptical display symbols gradually decreasing in diameter from left to right to correspond with the size of the actual rear sprockets 143. When initializing display control unit 20, the number of sprockets for rear transmission 109 can be set to match the actual number of sprockets installed on the bicycle. For example, when rear sprocket cluster 141 has eight sprockets, the number of rear sprockets 143 is input to the cycle computer. Thereafter, eight elliptical display symbols are displayed from left to right in rear gear position display portion 35, with the one remaining symbol at the right end not displayed.

Similarly, front gear position display portion 36 shows the gear position of front transmission 108, and it comprises a plurality of, e.g., three elliptical display symbols gradually increasing in diameter from left to right to correspond with the size of the actual front sprockets 137. When initializing display control unit 20, the number of sprockets for front transmission 108 can be set to match the actual number of front sprockets 137 installed on the bicycle. For example, when front transmission 108 has two sprockets, the number of front sprockets 137 is input to the cycle computer. Thereafter, two elliptical display symbols are displayed from right to left in front gear position display portion 36, with the one remaining symbol at the left end not displayed. As a result of rear gear position display portion 35 and front gear position display portion 36, the sprocket positions of front and rear transmissions 108 and 109 may be ascertained intuitively at a glance.

When the rider applies force to the pedals 132*a* and 132*b* and the bicycle 101 moves forward, the front wheel 105 correspondingly rotates, and the magnet 11 mounted on front wheel 105 rotates around the wheel axle. Every time magnet 11 passes coil 12 in rotation sensor 10, coil 12 generates electrical power by electromagnetic induction. The generated electrical power is rectified and conditioned by rectifier 13 and output to signal generating unit 14. Signal generating unit 14 operates using the generated electrical power and produces rotation signals in accordance with the rotation of the front wheel 105. The rotation signals are communicated to wireless transmission unit 15, are converted to rotation signals with a frequency of about 40 kHz, and are wirelessly transmitted. Since rotation sensor 10 operates using the electrical power generated by the rotation of front wheel 105, a separate power source is unnecessary, and rotation sensor 10 can be compactly configured and operated without elaborate power conversion devices.

The transmitted rotation signals are received by wireless receiving unit 21 in display control device 16 and output to display control unit 20. The speed and riding distance of the bicycle are calculated by display control unit 20 from the interval between successive rotation signals and the diameter of the front wheel 105. In addition, the transmission gear positions are determined from the output of gear position sensors 28 and 29. These data are displayed in the designated sections of display unit 22. Since display control device 16 operates using the electrical power generated by solar cell 27, a separate power source requiring elaborate power conversion devices is unnecessary.

While the above is a description of various embodiments of inventive features, further modifications may be employed without departing from the spirit and scope of the present invention. For example, in the described embodiment, rotation signals were generated by a microcomputer in rotation sensor 10, but an apparatus could be configured so that rotation signals are generated by analog or digital circuitry without the use of a microcomputer. While solar cell 27 was used as the power source for display control device 16, a normal primary or secondary battery also could be used. In this case, a low-capacity electrolyte capacitor or other storage element could be provided for backup.

Figure 6:
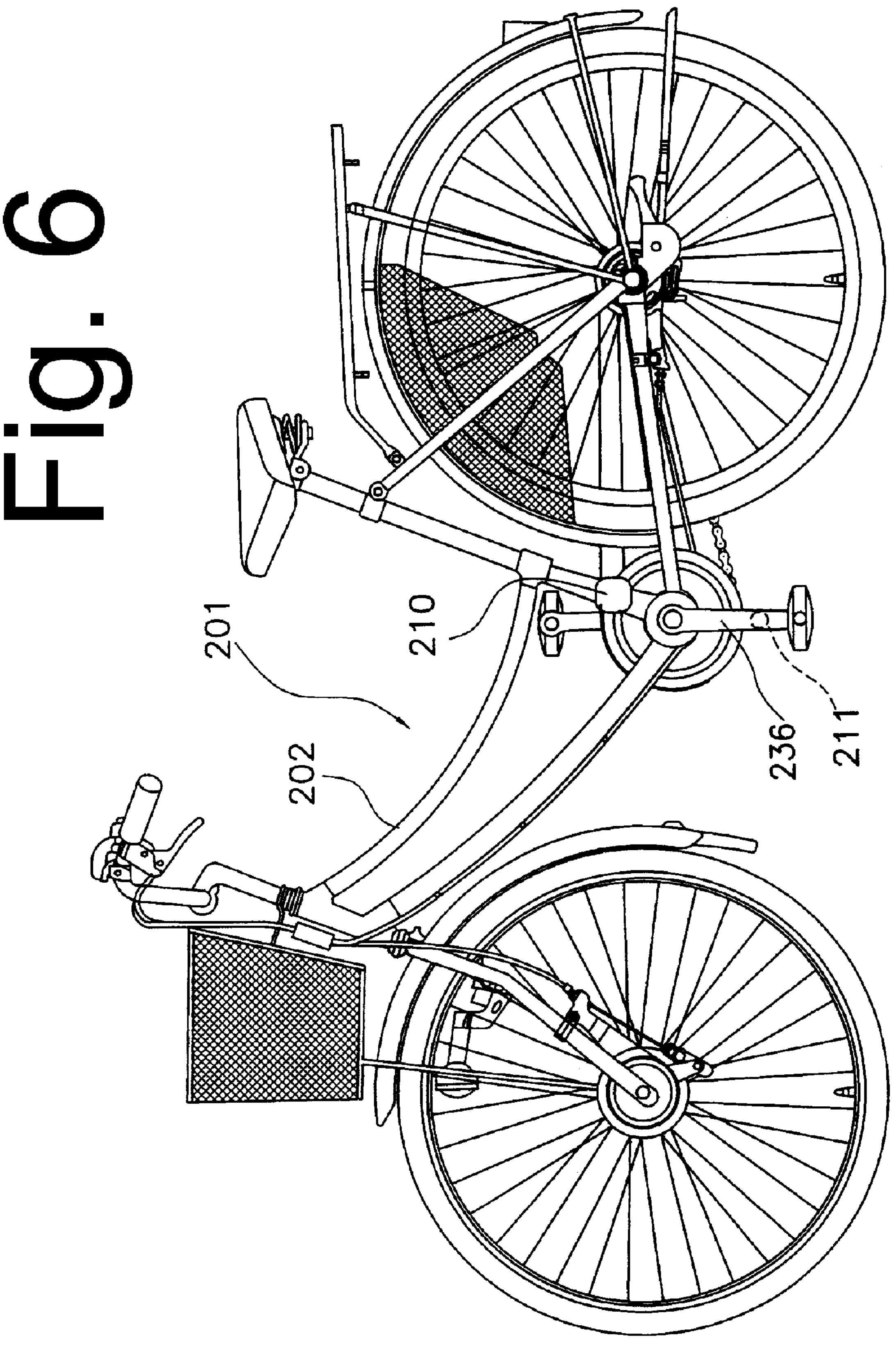
FIG. 6 is a side view of another embodiment of a bicycle.

In the above embodiment, rotation sensor 10 detected the rotation of front wheel 105 as a rotating part of the bicycle. However, other rotating parts of the bicycle could be detected as well. For example, as shown in FIG. 6, a rotation sensor 210 could be used to detect the rotation of a left crank 236 of a bicycle 201. In this embodiment, bicycle 201 includes a three-speed internal hub transmission mounted on the rear wheel. A magnet 211 may be mounted to left crank 236, and rotation sensor 210 (comprising a coil 12, rectifier 13, signal generating unit 14, and wireless transmission unit 15 as in the first embodiment) could be mounted on a frame 202 so that magnet 211 passes in close proximity as crank 236 rotates. The crank RPM could be displayed at display unit 22, and speed could be calculated using crank RPM, the current transmission gear and wheel RPM.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle signal output device comprising:

a magnet structured to be mounted to one of a first part and a moving part of a bicycle;

a coil structured to be mounted to the other one of the first part and the moving part of the bicycle to provide a signal in response to relative motion between the magnet and the coil;

a signal generating unit including a CPU, wherein operating power for the CPU is derived from the signal provided by the coil in response to relative motion between the magnet and the coil; and a wireless transmission unit that wirelessly transmits information generated by the signal generating unit.

2. The device according to claim 1 wherein the moving part of the bicycle is a bicycle wheel.

3. The device according to claim 1 wherein the moving part of the bicycle is a bicycle crank.

4. The device according to claim 1 wherein the magnet is structured to be mounted to the moving part of the bicycle.

5. The device according to claim 1 further comprising a rectifier that rectifies current provided by the coil in response to relative motion between the magnet and the coil.

6. The device according to claim 1 further comprising a voltage regulating element that regulates voltage provided by the coil in response to relative motion between the magnet and the coil.

7. The device according to claim 1 further comprising a housing that houses both the coil and the signal generating unit.

8. A bicycle information display apparatus comprising:

a magnet structured to be mounted to one of a first part and a moving part of a bicycle;

a coil structured to be mounted to the other one of the first part and the moving part of the bicycle to provide a signal in response to relative motion between the magnet and the coil;

a signal generating unit including a first CPU, wherein the first CPU operates using electrical power generated by the coil in response to relative motion between the magnet and the coil;

a wireless transmission unit that wirelessly transmits information generated by the signal generating unit;

a wireless receiving unit that receives information transmitted by the wireless transmission unit; and a display unit that displays information received by the wireless receiving unit.

9. The apparatus according to claim 8 further comprising a display control unit including a second CPU that converts the information received by the wireless receiving unit into the information displayed on the display unit.

10. The apparatus according to claim 9 wherein the display control unit converts the information received by the wireless receiving unit into a riding parameter.

11. The apparatus according to claim 10 wherein the riding parameter comprises bicycle speed.

12. The apparatus according to claim 8 further comprising a power supply that provides operating power to the display control unit.

13. The apparatus according to claim 12 wherein the power supply comprises a power storage element.

14. The apparatus according to claim 12 wherein the power supply comprises a solar cell.

15. The apparatus according to claim 14 wherein the power supply further comprises a power storage element that stores electrical power generated by the solar cell.

16. The device according to claim 8 wherein the moving part of the bicycle is a bicycle wheel.

17. The device according to claim 8 wherein the moving part of the bicycle is a bicycle crank.

18. The device according to claim 8 wherein the magnet is structured to be mounted to the moving part of the bicycle.

19. The device according to claim 8 further comprising a rectifier that rectifies current provided by the coil in response to relative motion between the magnet and the coil.

20. The device according to claim 8 further comprising a voltage regulating element that regulates voltage provided by the coil in response to relative motion between the magnet and the coil.

21. The device according to claim 1 wherein the first CPU generates information from the signal provided by the coil so that both operating power for the first CPU and the information generated by the first CPU are derived from the signal provided by the coil.

22. The device according to claim 8 wherein the first CPU generates information from the signal provided by the coil so that both operating power for the first CPU and the information generated by the first CPU are derived from the signal provided by the coil.

23. The device according to claim 13 wherein the power supply comprises a non-battery power supply.

24. The device according to claim 8 wherein the signal generating unit and the wireless transmission unit are housed in a first housing, and wherein the wireless receiving unit and the display unit are housed in a second housing that is not wired to the first housing.

* * * * *